(12) United States Patent
Gerber

(10) Patent No.: US 11,131,354 B1
(45) Date of Patent: Sep. 28, 2021

(54) ELECTROMECHANICAL BRAKE SYSTEM INCLUDING A FORCE APPLICATION APPARATUS

(71) Applicant: ZF ACTIVE SAFETY US INC., Livonia, MI (US)

(72) Inventor: Kraig E. Gerber, Plymouth, MI (US)

(73) Assignee: ZF Active Safety US Inc., Livonia, MI (US)

( * ) Notice: Subject to any disclaimer, the term of this patent is extended or adjusted under 35 U.S.C. 154(b) by 81 days.

(21) Appl. No.: 16/834,501

(22) Filed: Mar. 30, 2020

(51) Int. Cl.
| | |
|---|---|
| F16D 55/18 | (2006.01) |
| F16D 65/18 | (2006.01) |
| B60T 13/74 | (2006.01) |
| F16D 125/40 | (2012.01) |
| F16D 121/24 | (2012.01) |
| F16D 65/38 | (2006.01) |
| B60T 1/06 | (2006.01) |
| F16D 55/226 | (2006.01) |
| F16D 125/02 | (2012.01) |

(52) U.S. Cl.
CPC .......... F16D 65/183 (2013.01); B60T 13/746 (2013.01); *B60T 1/065* (2013.01); *F16D 55/226* (2013.01); *F16D 65/38* (2013.01); *F16D 2121/24* (2013.01); *F16D 2125/02* (2013.01); *F16D 2125/40* (2013.01)

(58) Field of Classification Search
CPC ........ F16D 55/08; F16D 55/46; F16D 55/225; F16D 55/228
USPC ............................ 188/72.2, 72.6, 72.7, 72.9
See application file for complete search history.

(56) References Cited

U.S. PATENT DOCUMENTS

| | | | | |
|---|---|---|---|---|
| 3,547,229 | A * | 12/1970 | Pollinger | F16D 55/228 188/59 |
| 7,182,181 | B2 * | 2/2007 | Severinsson | F16D 55/228 188/71.9 |
| 8,910,755 | B2 * | 12/2014 | Baumgartner | F16D 55/225 188/72.2 |
| 9,080,626 | B2 * | 7/2015 | Miller | F16D 65/092 |
| 2004/0026184 | A1 * | 2/2004 | Baumann | F16D 65/54 188/72.7 |

* cited by examiner

*Primary Examiner* — Christopher P Schwartz
(74) *Attorney, Agent, or Firm* — Robert James Harwood

(57) ABSTRACT

An electromechanical brake system includes a housing defining a mechanism cavity. An apparatus for force application includes a first piston, including a first piston motivator comprising a first push rod and an actuator. A brake pad is operatively connected to both the first and second pistons for longitudinal driving thereby. A rocker arm is operatively connected to both the first and second pistons for force transmission therebetween. A pivot bearing rotatably supports the rocker arm. The actuator is configured to move selectively longitudinally with respect to the first push rod to move at least a portion of the first piston toward the brake pad. The pivot bearing is maintained in a predetermined longitudinal position as a reaction force is developed between the first piston and the brake pad. The rocker arm transmits at least a portion of the reaction force from the first push rod to the second piston.

11 Claims, 2 Drawing Sheets

ELECTROMECHANICAL BRAKE SYSTEM INCLUDING A FORCE APPLICATION APPARATUS

TECHNICAL FIELD

This disclosure relates to an apparatus for force application and, more particularly, to an electromechanical brake system including a force application apparatus.

BACKGROUND

Vehicle brake systems typically have a service brake that has service brake apply modes and a parking brake system that has parking brake apply modes. During a service brake apply hydraulic pressure is applied to move a piston. In recent systems, during a parking brake apply, an electric motor and drive mechanism moves the piston to create the parking brake apply by pressing one or more brake pads against a brake rotor. Once the parking brake apply is complete, the electric motor is turned off. Typically, several gear and/or belt stages and a rotary to linear stage (e.g., lead screw) are located between the piston and the motor.

SUMMARY

In an aspect, an electromechanical brake system is described. A housing defines a mechanism cavity. An apparatus for force application, including first and second pistons, is located at least partially within the mechanism cavity. A brake pad is operatively connected to both the first and second pistons for longitudinal driving thereby. The apparatus for force application includes the first piston, including a first piston motivator comprising a first push rod and an actuator. The first piston is configured for selective longitudinal travel. The second piston is spaced laterally from the first piston. The second piston is configured for selective longitudinal travel. A rocker arm is operatively connected to both the first and second pistons for force transmission therebetween. A pivot bearing rotatably supports the rocker arm. The actuator is configured to move selectively longitudinally with respect to the first push rod to move at least a portion of the first piston toward the brake pad. The pivot bearing is maintained in a predetermined longitudinal position as a reaction force is developed between the first piston and the brake pad. The rocker arm transmits at least a portion of the reaction force from the first push rod to the second piston.

BRIEF DESCRIPTION OF THE DRAWINGS

For a better understanding, reference may be made to the accompanying drawings, in which.

DESCRIPTION OF ASPECTS OF THE DISCLOSURE

Figure 1:
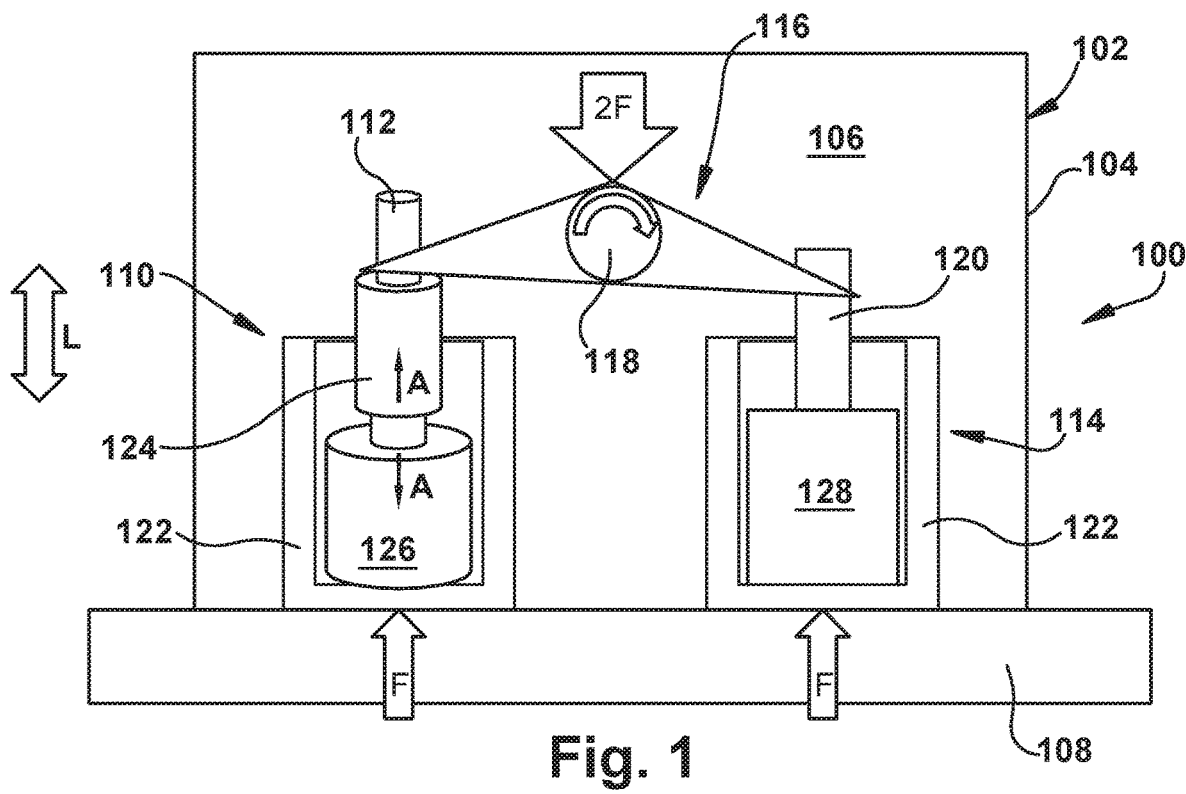
FIG. 1 is a schematic side view of an apparatus for force application.

Unless defined otherwise, all technical and scientific terms used herein have the same meaning as is commonly understood by one of ordinary skill in the art to which the present disclosure pertains.

As used herein, the singular forms "a," "an", and "the" can include the plural forms as well, unless the context clearly indicates otherwise. It will be further understood that the terms "comprises" and/or "comprising," as used herein, can specify the presence of stated features, steps, operations, elements, and/or components, but do not preclude the presence or addition of one or more other features, steps, operations, elements, components, and/or groups thereof.

As used herein, the term "and/or" can include any and all combinations of one or more of the associated listed items.

It will be understood that when an element is referred to as being "on," "attached" to, "connected" to, "coupled" with, "contacting", "adjacent", etc., another element, it can be directly on, attached to, connected to, coupled with, contacting, or adjacent the other element, or intervening elements may also be present. In contrast, when an element is referred to as being, for example, "directly on," "directly attached" to, "directly connected" to, "directly coupled" with, "directly contacting", or "directly adjacent" another element, there are no intervening elements present. It will also be appreciated by those of ordinary skill in the art that references to a structure or feature that is disposed "directly adjacent" another feature may have portions that overlap or underlie the adjacent feature, whereas a structure or feature that is disposed "adjacent" another feature might not have portions that overlap or underlie the adjacent feature.

Spatially relative terms, such as "under," "below," "lower," "over," "upper", "proximal", "distal", and the like, may be used herein for ease of description to describe one element or feature's relationship to another element(s) or feature(s) as illustrated in the figures. It will be understood that the spatially relative terms can encompass different orientations of a device in use or operation, in addition to the orientation depicted in the figures. For example, if a device in the figures is inverted, elements described as "under" or "beneath" other elements or features would then be oriented "over" the other elements or features.

As used herein, the phrase "at least one of X and Y" can be interpreted to include X, Y, or a combination of X and Y. For example, if an element is described as having at least one of X and Y, the element may, at a particular time, include X, Y, or a combination of X and Y, the selection of which could vary from time to time. In contrast, the phrase "at least one of X" can be interpreted to include one or more Xs.

It will be understood that, although the terms "first," "second," etc. may be used herein to describe various elements, these elements should not be limited by these terms. These terms are only used to distinguish one element from another. Thus, a "first" element discussed below could also be termed a "second" element without departing from the teachings of the present disclosure. The sequence of operations (or steps) is not limited to the order presented in the claims or figures unless specifically indicated otherwise.

The invention comprises, consists of, or consists essentially of the following features, in any combination.

FIG. 1 depicts an apparatus 100 for force application. The force application apparatus 100 can be used, for example, in an electromechanical brake system, shown schematically at 102 in FIG. 1. The electromechanical brake system 102 includes a housing, shown schematically at 104 in FIG. 1, defining a mechanism cavity 106. The apparatus 100 is located at least partially within the mechanism cavity 106. A brake pad 108 is operatively connected to the apparatus 100 for longitudinal driving thereby. The "longitudinal" direction, as referenced herein, is substantially parallel to arrow "L" in FIG. 1, and extends substantially along the vertical direction, in the orientation of the Figures.

In the apparatus 100, a first piston 110 includes a first piston motivator which comprises a first push rod 112 and an actuator 124. The first piston 110 is configured for selective longitudinal travel along axial direction A, as shown in FIG. 1. A second piston 114 is spaced laterally from the first piston 110 and is also configured for selective longitudinal travel. (The "lateral" direction, as referenced herein, is substantially perpendicular to the longitudinal direction and may be, for example, the horizontal direction, in the orientation of the Figures.) A second push rod 120 may be provided for transmitting force from the rocker arm 116 to the second piston 114.

The actuator 124 could be any desired type, such as, but not limited to, at least one of a lead screw, a ball ramp, a ball screw, a roller screw, a fluid-driven cylinder, or any other suitable mechanism. The first push rod 112 could be a spindle. The first piston 110 could include an adjuster nut 126 which axially translates under influence of the actuator 124 and/or the first push rod 112. The actuator 124 could translate axially along the first push rod 112 to move the first piston 110 longitudinally toward the brake pad 108. One of ordinary skill in the art will be able to provide a suitable mechanism for selectively actuating the first push rod 112 and providing a suitable amount of force exerted by the first push rod 112 for a particular use environment, as described below.

The brake pad 108 of the electromechanical brake system 102, for example, may be operatively connected to both the first and second pistons 110 and 114 for longitudinal driving thereby, as will be described below.

A rocker arm 116 is operatively connected to both the first and second pistons 110 and 114 for force transmission therebetween. For example, and as referenced in the below description, the rocker arm 116 can transfer force from the first piston 110 to the second piston 114. The rocker arm 116 could be directly connected to the actuator 124, or one or more other components (e.g., a pivoting connection) could be interposed mechanically therebetween.

A pivot bearing 118 rotatably supports the rocker arm 116. The pivot bearing 118 could be of any suitable type. It is contemplated that a single piece rocker arm 116 and pivot bearing 118 combination could be "pinned" to the housing 104 or to any other suitable structure of a larger mechanism, adjacent the apparatus 100. It is contemplated that, like all components of the apparatus 100, the rocker arm 116 and pivot bearing 118 could have any suitable form factors or configurations, and/or could have their functions combined into a single structure. For example, the rocker arm 116 could be shaped as an arched beam, and could pivot on a "pin" on either the outside or inside of the curve or arch (e.g., in a motion like a rocking chair or seesaw).

A cup 122 may be provided as a portion of at least one of the first and second pistons 110 and 114. When present, the cup 122 may at least partially laterally enclose a remaining component(s) of at least one of the first and second pistons 110 and 114. The cup 122 is a part of the piston which helps spread force from the first or second piston 110 or 114 to the brake pad 108 or other ground surface to which the apparatus 100 is applying force, in a known manner.

Figure 2A:
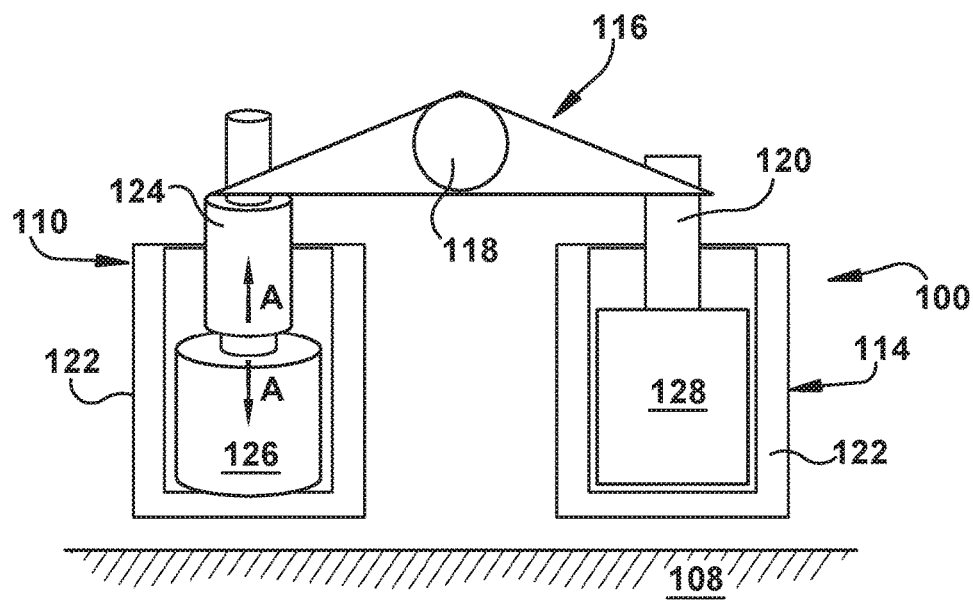
FIGS. 2A-2C schematically depict an example sequence of operation of the apparatus of FIG. 1.

The second piston 114 may include a wear compensation adjuster 128 configured to selectively change a longitudinal home position of the second piston 114. The longitudinal home position is depicted in FIG. 2A and indicates a "resting" or "un-energized" condition of the apparatus 100. For example, and when the apparatus 100 is used in an electromechanical brake system 102, brake pad 108 wear may result in the need for one or both of the first and second pistons 110 and 114 to travel an increased distance to apply force to the brake pad 108, over time. While it may be relatively easy for the first piston 110 to be adjusted for that increased travel distance, due to the dynamic longitudinal motion of the actuator 124 and/or the first push rod 112, the need for the second piston 114 to travel further from a "home" position could result in undesirably large pivoting of the rocker arm 116 during operation.

To mitigate this issue, the wear compensation adjuster 128 could be provided. A wear compensation adjuster 128 could be of any suitable type, such as, but not limited to, a manually and/or automatically adjustable mechanism which allows the distance from the lowermost surface of the second piston 114 to be moved toward the brake pad 108 and maintained there during subsequent operation of the apparatus 100. The wear compensation adjuster 128 is contemplated to be used on an occasional basis during the life of the apparatus 100 and generally whenever appropriate to "take up" wear-caused spacing in the apparatus 100, as opposed to the axial expansion (and subsequent retraction) of the first push rod 112 of the first piston 110 during each use of the apparatus 100.

Figure 2B:
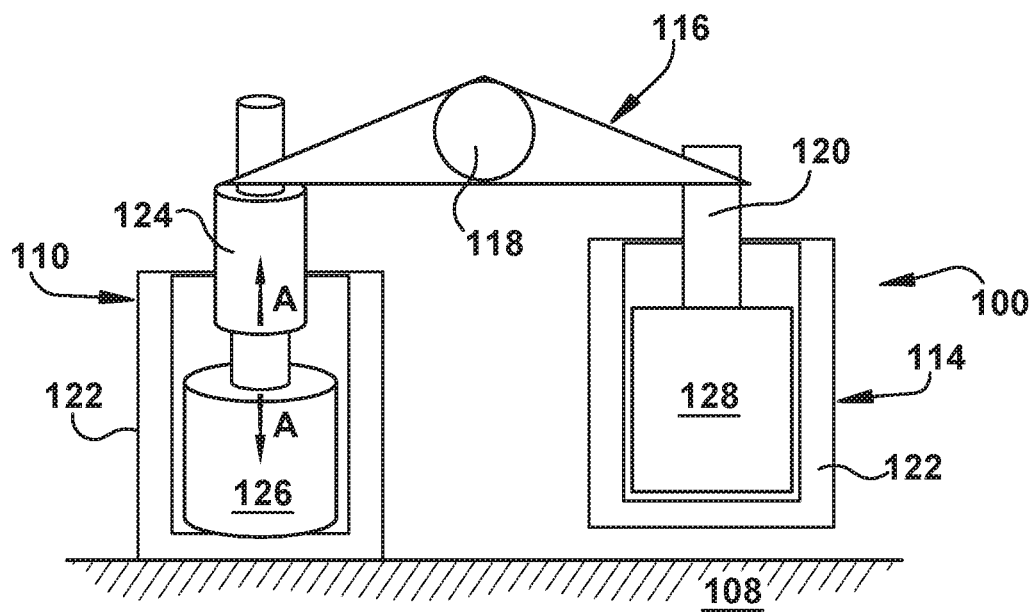
Figure 2C:
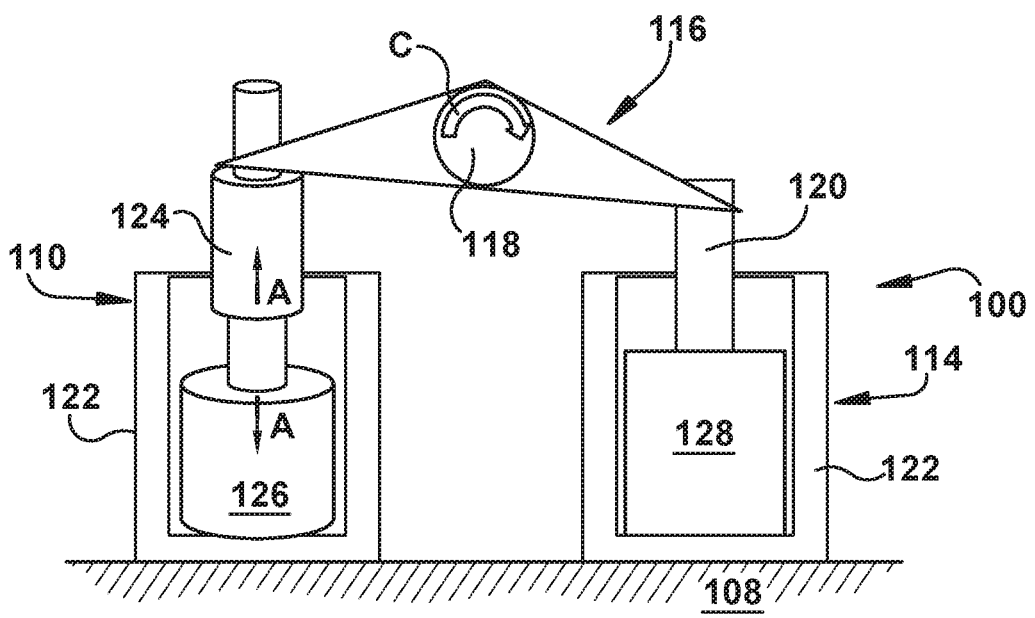

FIGS. 2A-2C depict an example sequence of operation of the apparatus 100. In FIG. 2A, the apparatus 100 is in a "home" or initial position. The lowermost surfaces of both the first and second pistons 110 and 114 are spaced longitudinally apart from the underlying surface, shown here as brake pad 108, to which a laterally diffuse force is desired to be applied by the first and second pistons 110 and 114. As shown by arrows A in the Figures, the first push rod 112 is translated longitudinally with respect to the rocker arm 116 (for example, by threadable movement of the first push rod 112 with respect to an actuator 124 attached to the rocker arm 116) to move the first piston 110 longitudinally, into contact with the underlying surface (here, brake pad 108), as shown in FIG. 2B. That is, the actuator 124 can move selectively longitudinally with respect to the first push rod 112 (regardless of which of these components moves in an absolute frame of reference) to move at least a portion of the first piston 110 toward the brake pad 108.

From FIG. 2A to FIG. 2B, the rocker arm 116 remains in a substantially static position, though it is contemplated that some small motion may occur incidentally. Then, as the apparatus 100 moves in the sequence from FIG. 2B to FIG. 2C, the rocker arm 116 rotates in a first direction (here, clockwise, as indicated by arrow "C") about the pivot bearing 118, as the first piston 110 has its downward travel interrupted by the underlying brake pad 108 surface and begins to exert a first reaction force upward during continued axial expansion of the first push rod 112. Throughout operation of the apparatus 100, including as the first reaction force is developed between the first piston 110 and the brake pad 108 responsive to longitudinal motion of the actuator 124 relative to the first push rod 112, the pivot bearing 118 is maintained in a predetermined longitudinal position. The rocker arm 116 is shown in FIG. 2A-2B as transmitting at least a portion of the first reaction force from the first push rod 112 to the second piston 114.

As shown in FIG. 2C, then, the rocker arm 116 transmits force from the first push rod 112 to the second piston 114. This transmitted force causes the second piston 114 to move downward toward the underlying surface, optionally at a slight, but insignificant for most use environments, time lag behind the first piston's 110 motion, and therefore the second piston 114 develops a second reaction force upon the underlying surface (again, here shown as brake pad 108) at a distance laterally spaced from the force exertion of the first piston 110 upon the underlying surface. Once both the first and second pistons 110 and 114 contact the underlying surface, the static longitudinal position of the pivot bearing 118 will resist further motion of the first and second pistons 110 and 114 downward, but further first reaction force can be exerted between the first push rod 112 (in many use environments, from the actuator 124) and the brake pad 108. In this way, a clamping force can be developed between the first and second pistons 110 and 114 upon the underlying surface. (It should be understood that the brake pad 108 could compress, or that other components of the apparatus 100 could move slightly, to flexibly accommodate transfer of forces as desired.)

The first and second pistons 110 and 114 could be thought of as "driving" and "driven" or "leading" and "following" pistons, respectively. With reference back to FIG. 1, a longitudinally upward reaction force of magnitude F will be exerted upon at least one of the first and second pistons 110 and 114 by the underlying surface. As referenced here, the first reaction force (F) is developed between the first piston 110 and the brake pad 108 and a second reaction force (F) is developed between the second piston 114 and the brake pad 108. It is contemplated that, for many use environments, the first and second reaction forces may be substantially equal to each other. A maintenance force at the pivot bearing 118 of magnitude 2F is developed—that is, the maintenance force is equal to a total of the first and second reaction forces. The maintenance force and first and second reaction forces all contribute to a desired clamping force for the brake pad 108, when the apparatus 100 is in an electromechanical brake system use environment. Through use of the apparatus 100, a single actuator 124 can be used to substantially equally spread an applied force out across two pistons, and/or to act as a force multiplier to increase the effectiveness of a single applied force. The pistons could each be configured with any desired footprint for force-spreading interaction with the underlying surface, regardless of the specific application of the apparatus 100.

While aspects of this disclosure have been particularly shown and described with reference to the example aspects above, it will be understood by those of ordinary skill in the art that various additional aspects may be contemplated. For example, the specific methods described above for using the apparatus are merely illustrative; one of ordinary skill in the art could readily determine any number of tools, sequences of steps, or other means/options for placing the above-described apparatus, or components thereof, into positions substantively similar to those shown and described herein. In an effort to maintain clarity in the Figures, certain ones of duplicative components shown have not been specifically numbered, but one of ordinary skill in the art will realize, based upon the components that were numbered, the element numbers which should be associated with the unnumbered components; no differentiation between similar components is intended or implied solely by the presence or absence of an element number in the Figures. Any of the described structures and components could be integrally formed as a single unitary or monolithic piece or made up of separate sub-components, with either of these formations involving any suitable stock or bespoke components and/or any suitable material or combinations of materials. Any of the described structures and components could be disposable or reusable as desired for a particular use environment. Any component could be provided with a user-perceptible marking to indicate a material, configuration, at least one dimension, or the like pertaining to that component, the user-perceptible marking potentially aiding a user in selecting one component from an array of similar components for a particular use environment. A "predetermined" status may be determined at any time before the structures being manipulated actually reach that status, the "predetermination" being made as late as immediately before the structure achieves the predetermined status. The term "substantially" is used herein to indicate a quality that is largely, but not necessarily wholly, that which is specified—a "substantial" quality admits of the potential for some relatively minor inclusion of a non-quality item. Though certain components described herein are shown as having specific geometric shapes, all structures of this disclosure may have any suitable shapes, sizes, configurations, relative relationships, cross-sectional areas, or any other physical characteristics as desirable for a particular application. Any structures or features described with reference to one aspect or configuration could be provided, singly or in combination with other structures or features, to any other aspect or configuration, as it would be impractical to describe each of the aspects and configurations discussed herein as having all of the options discussed with respect to all of the other aspects and configurations. A device or method incorporating any of these features should be understood to fall under the scope of this disclosure as determined based upon the claims below and any equivalents thereof.

Other aspects, objects, and advantages can be obtained from a study of the drawings, the disclosure, and the appended claims.

I claim:

1. An electromechanical brake system, comprising:
   a housing defining a mechanism cavity;
   an apparatus for force application having first and second pistons is located at least partially within the mechanism cavity; and
   a brake pad, operatively connected to both the first and second pistons for longitudinal driving thereby;
   the apparatus for force application including
      the first piston, including a first piston motivator comprising a first push rod and an actuator, the first piston being configured for selective longitudinal travel;
      the second piston, spaced laterally from the first piston, the second piston being configured for selective longitudinal travel;
      a rocker arm, operatively connected to both the first and second pistons for force transmission therebetween, and
      a pivot bearing, rotatably supporting the rocker arm;
   wherein the actuator is configured to move selectively longitudinally with respect to the first push rod to move at least a portion of the first piston toward the brake pad, the pivot bearing is maintained in a predetermined longitudinal position as a reaction force is developed between the first piston and the brake pad, and the rocker arm transmits at least a portion of the reaction force from the first push rod to the second piston.

2. The apparatus of claim 1, including a force transmitting head on at least one of the first and second pistons.

3. The apparatus of claim 2, wherein the force transmitting head at least partially laterally encloses at least one of the first and second pistons.

4. The apparatus of claim 1, wherein the actuator is at least one of a lead screw, a ball ramp, a ball screw, a roller screw, and a fluid-driven cylinder.

5. The apparatus of claim 1, wherein the actuator translates axially along the first push rod to move the first piston longitudinally toward the brake pad.

6. The apparatus of claim 1, wherein the reaction force is developed between the first piston and the brake pad responsive to longitudinal motion of the actuator relative to the first push rod.

7. The apparatus of claim 1, wherein the reaction force is a first reaction force, a second reaction force is developed between the second piston and the brake pad, and a maintenance force equal to a total of the first and second reaction forces is developed at the pivot bearing.

8. The apparatus of claim 7, wherein the first and second reaction forces are substantially equal.

9. The apparatus of claim 1, wherein the second piston includes a wear compensation adjuster configured to selectively change a longitudinal home position of the second piston.

10. The apparatus of claim 1, wherein the rocker arm is directly connected to the actuator.

11. The apparatus of claim 1, including a second push rod for transmitting force from the rocker arm to the second piston.

* * * * *